United States Patent [19]

Kikuchi et al.

[11] Patent Number: 4,463,360

[45] Date of Patent: Jul. 31, 1984

[54] HEAT TRANSFER RECORDING APPARATUS

[75] Inventors: Yoshiki Kikuchi; Takashi Ohmori; Haruhiko Moriguchi, all of Kanagawa, Japan

[73] Assignee: Fuji Xerox Co., Ltd., Tokyo, Japan

[21] Appl. No.: 312,020

[22] Filed: Oct. 16, 1981

[30] Foreign Application Priority Data

Oct. 17, 1980 [JP] Japan ............................... 55-144419

[51] Int. Cl.³ ....................... G01D 15/10; G01D 15/34

[52] U.S. Cl. ............................. 346/76 PH; 346/135.1

[58] Field of Search .......................... 346/76 PH, 135.1

[56] References Cited

U.S. PATENT DOCUMENTS 4,195,937 4/1980 Baran ......................... 346/76 PH X
4,359,748 11/1982 Pasini et al. .................... 346/76 PH

*Primary Examiner*—George H. Miller, Jr.
*Attorney, Agent, or Firm*—Sughrue, Mion, Zinn, Macpeak, and Seas

[57] ABSTRACT

In a heat transfer recording apparatus, the recording medium and ink donor film are drawn from separate sources and joined together only for the recording operation.

1 Claim, 2 Drawing Figures

HEAT TRANSFER RECORDING APPARATUS

ACKGROUND OF THE INVENTION

This invention relates to a heat tranfer recording apparatus employing an ink donor film, and more particularly, to such an apparatus which can prevent formation by any 'wrinkle' on the ink donor film.

A heat transfer recording system employing an ink donor film and a thermal head (heating element), and adapted for selective heat transfer of ink from the film to a recording medium has the advantage of permitting the recording of information on ordinary paper at a lower cost.

The ink donor film having one surface coated with a hot-melt ink has hitherto been in the form of a composite roll on which the film is wound with recording paper, and the ink surface of the film is superposed on the recording paper. The ink donor film and the recording paper are drawn from their composite roll by a pair of drive rollers, and transported to the recording station in their superposed condition. The thermal head transfers ink from the ink donor film to the recording paper by selective heating, and the paper is then separated from the ink donor film. The ink donor film is wound on a take-up roll, and recovered. The recording paper is discharged through a discharge opening after it has been cut as required.

FIG. 1 is an exaggerated illustration of the mechanism by which the ink donor film and the recording paper are withdrawn from their composite roll in a conventional heat transfer recording apparatus. The recording paper 4 and the ink donor film 5 are withdrawn from the composite roll 1 by a pair of drive rolls 2 and 3, and their thicknesses are designated as $t_1$ and $t_2$, respectively. The ink donor film 5, which is wound outwardly of the paper 4, has a greater withdrawn length of approximately $\pi(t_1+t_2)$ than the paper 4 for each revolution of the composite roll 1. Accordingly, the ink donor film 5 slackens. The 'slack' forms a wave on the ink donor film 5, resulting in the formation of 'wrinkle' which may bring the film out of contact with the paper and disable recording by heat tranfer at the recording station.

SUMMARY OF THE INVENTION

In view of these circumstances, it is an object of this invention to provide a heat transfer recording apparatus which can prevent formation of any such 'wrinkle' on the ink donor film. According to this invention, the aforesaid object is attained by supplying an ink donor film and recording paper separately from independent sources of supply, and superposing them on each other in the vicinity of a recording station.

BRIEF DESCRIPTION OF THE DRAWINGS

The invention will now be described in detail with reference to the accompanying drawings, in which.

DETAILED DESCRIPTION OF THE INVENTION

Figure 1:
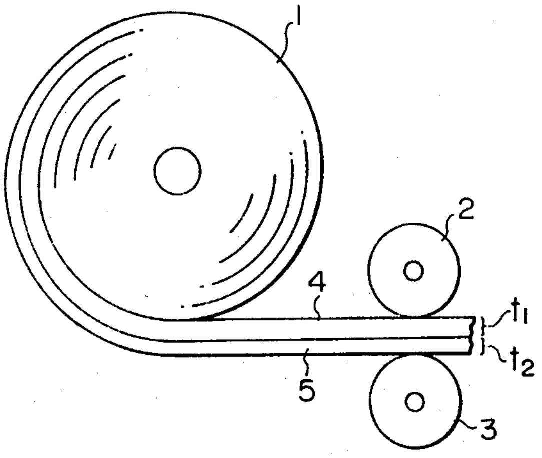
FIG. 1 PRIOR ART
FIG. 1 is a view of a conventional heat tranfer recording apparatus employing a composite roll of ink donor film and recording paper.
Figure 2:
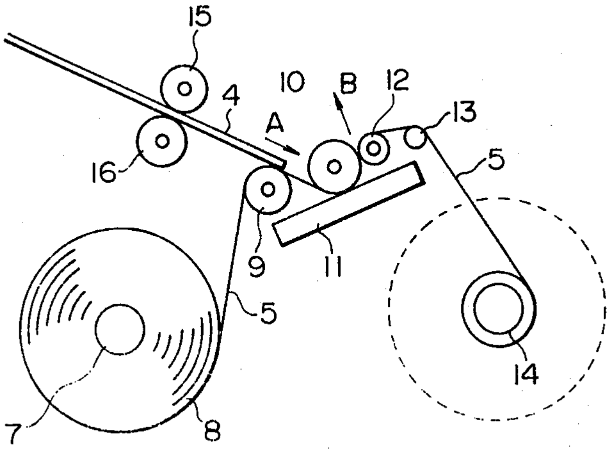
FIG. 2 is a view showing schematically the arrangement of the heat tranfer recording apparatus embodying this invention.

FIG. 2 schematically shows a heat tranfer recording apparatus embodying this invention. The apparatus includes a supply roll 7 for an ink donor film 5 on which the film is wound to form a roll 8. The ink donor film 5 is withdrawn from the roll 8, and guided by a guide roll 9 in a different direction shown by an arrow A. The film then passes through the area of contact between a back roll 10 and a thermal head 11, and the area of contact between the back roll 10 and a drive roll 12, and about a guide roll 13, and is wound on a take-up roll 14.

The recording paper 4 is withdrawn by a pair of feed rolls 15 and 16 from a paper source (not shown) which is different from that for the ink donor film 5, and travels in the direction of the arrow A at a speed which is equal to that at which the ink donor film 5 travels. The leading end of the paper 4 contacts the ink surface of the ink donor film 5 in the region where the film 5 leaves the guide roll 9 (FIG. 2). The paper 4 and the ink donor film 5 are superposed on each other, and enter the recording station defined by the back roll 10 and the thermal head 11.

In the recording station, the thermal head 11 applies heat selectively to the surface of the ink donor film 5, whereby ink is selectively tranferred to the surface of the recording paper 4 sandwiched between the ink donor film 5 and the back roll 10 for recording information thereon by heat transfer. Then, the recording paper 4 travels along the common tangential line of the back roll 10 and the drive roll 12 (in the direction of an arrow B), and is separated from the ink donor film 5.

In the heat tranfer recording apparatus as hereinabove described, the ink donor film 5 is always directed by the guide roll 9 in the direction of the arrow A for entry into the recording station, even after the roll 8 of the ink donor film has reduced its diameter with the progress of the recording operation. Thus, the recording paper 4 and the ink donor film 5 are always superposed on each other without involving any undue force; therefore, there is no fear of any 'wrinkle' being formed in the recording station.

According to this invention, the ink donor film and the recording paper are supplied from different sources of supply as hereinabove described. This arrangement makes it possible to control tension on the ink donor film independently, thereby preventing its 'slackening' more effectively. The guide roll (guide mechanism) provided between the supply roll and the back roll as shown in the embodiment further facilitates the control of tension on the ink donor film. This invention can advantageously prevent 'slackening' of the ink donor film, even if any change in humidity causes the recording paper to contract, since it is only immediately prior to their entry into the recording station that the ink donor film and the recording paper are superposed on each other.

What is claimed is:

1. A heat transfer recording apparatus comprising first source means for supplying a heat transfer-type ink donor film, second source means for supplying a recording medium, a recording station having heating means and a transport system by which said ink donor film and said recording medium are delivered from said first and second source means independently of each other and are brought into superimposed contact with one another at a point prior to said recording station for movement in the same direction for simultaneous passage through said recording station, said transport system including a donor film guide roller in the travel path of said donor film between said film source and the point of contact with said film guide roller determining the path of said donor film at said point of contact regardless of any change in said second source means, and said recording station including a second roller around which said superimposed film and recording medium pass with said medium in contact with said roller and said heating means disposed adjacent said donor film in the vicinity of said second roller for selectively heating said film for recording information on said recording medium by heat transfer.

* * * * *